United States Patent
Une

(10) Patent No.: US 7,573,507 B2
(45) Date of Patent: Aug. 11, 2009

(54) WHITE BALANCE CONTROLLING APPARATUS, METHOD, PROGRAM, AND IMAGE PICKUP APPARATUS

(75) Inventor: Hideho Une, Tokyo (JP)

(73) Assignee: Sony Corporation (JP)

( * ) Notice: Subject to any disclaimer, the term of this patent is extended or adjusted under 35 U.S.C. 154(b) by 494 days.

(21) Appl. No.: 11/431,813

(22) Filed: May 10, 2006

(65) Prior Publication Data

US 2006/0262198 A1    Nov. 23, 2006

(30) Foreign Application Priority Data

May 11, 2005    (JP)    ............................ P2005-138201

(51) Int. Cl.
*H04N 9/73*    (2006.01)
(52) U.S. Cl. .................................. 348/223.1
(58) Field of Classification Search ............... 348/223.1
See application file for complete search history.

(56) References Cited

U.S. PATENT DOCUMENTS

| | | | |
|---|---|---|---|
| 6,876,384 | B1 | 4/2005 | Hubina et al. |
| 7,199,822 | B2 * | 4/2007 | Fujino ..................... 348/223.1 |
| 2002/0071041 | A1 * | 6/2002 | Pine ........................... 348/222 |
| 2002/0080245 | A1 | 6/2002 | Parulski et al. |
| 2002/0106206 | A1 | 8/2002 | Takeshita |
| 2003/0052978 | A1 * | 3/2003 | Kehtarnavaz et al. .... 348/223.1 |
| 2006/0001748 | A1 * | 1/2006 | Kamon et al. ............... 348/234 |

FOREIGN PATENT DOCUMENTS

| | | |
|---|---|---|
| EP | 0433672 | 6/1991 |
| EP | 0658058 | 6/1995 |
| JP | 2003-259380 | 9/2003 |

OTHER PUBLICATIONS

European Search Report, EP 06 25 2429.

* cited by examiner

*Primary Examiner*—Nhan T Tran
*Assistant Examiner*—Amy Hsu
(74) *Attorney, Agent, or Firm*—Lerner, David, Littenberg, Krumholz & Mentlik, LLP

(57) ABSTRACT

A white balance controlling apparatus can discriminate a green subject under a light source of the sun and a white subject under a fluorescent light source without the addition of a new color filter. The maximum or average value of luminance at a first portion of an image signal for one frame or field which includes pixels discriminated as pixels of green under a light source of the sun or white under a fluorescent light source is compared with that at any other portion of the image signal. If the maximum or average value of luminance at the first portion is either lower or higher than that at the other portion, then it is estimated that either a light source of the sun or a fluorescent light source is used.

8 Claims, 5 Drawing Sheets

WHITE BALANCE CONTROLLING APPARATUS, METHOD, PROGRAM, AND IMAGE PICKUP APPARATUS

CROSS-REFERENCE TO RELATED APPLICATIONS

The present application claims priority from Japanese Patent Application No. JP 2005-138201 filed on May 11, 2005, the disclosure of which is hereby incorporated by reference herein.

BACKGROUND OF THE INVENTION

This invention relates to a white balance controlling apparatus, method and program for controlling the adjustment amount for a color signal for the adjustment of the white balance and image pickup apparatus thereof.

In recent years, an image pickup apparatus such as a digital still camera, a digital video camera and so forth for which a solid-state image pickup device is used has been and is being popularized rapidly. In such an image pickup apparatus as just mentioned, various digital signal processes for correcting the picture quality are performed for a signal obtained by image pickup. As a representative one of image quality correction functions, a white balance adjustment function is known. The white balance adjustment function is a function for adjusting the hue so that a white color is displayed property in response to the color temperature of an image pickup light source for a subject. Also an image pickup apparatus is used frequently which includes an automatic white balance function for detecting the color temperature of an image pickup light source using a signal of a picked up image or an external detector to automatically adjust the hue. Generally, according to the automatic white balance function, a gain is applied to each of RGB signals in a signal of a picked up image so that red, green and blue are equal in ratio to each other at a white color point to be used as a reference in the picked up image.

Incidentally, a green subject such as a leaf under a light source of the sun and a white subject such as a piece of tableware under a light source of a fluorescent lighting have spectral characteristics substantially same as each other. Therefore, where RGB signals in a signal of a picked up image are separated by a color filter, the RGB signals appear as signals substantially same as each other, and discrimination of the signals is difficult. Therefore, there is a problem to be solved that green under a light source of the sun is decided as white in error under a light source of a fluorescent lighting and a white balance adjustment process suitable for a light source of a fluorescent lighting is performed for the green. Further, there is another problem that, conversely, white under a light source of a fluorescent lighting is decided as green in error under a light source of the sun and a white balance adjustment process suitable for a light source of the sun is performed for the white.

In order to solve the problems, a technique has been proposed wherein the number of color filters is increased to detect an emission line unique to a light source of a fluorescent lighting to discriminate whether a subject is a green subject which is under a light source of the sun or a white subject which is under a light source of a fluorescent lighting. The technique is disclosed, for example, in Japanese Patent Laid-Open No. 2003-259380.

However, according to the technique disclosed in Japanese Patent Laid-Open No. 2003-259380, since it includes a new color filter provided additionally, the structure of an image pickup device and the configuration of a processing circuit for an image pickup signal must be altered. Therefore, the production cost increases.

It is desired to provide a white balance controlling apparatus which can enhance the quality of images to be obtained by image pickup of a green subject under a light source of the sun and a white subject under a light source of a fluorescent lighting without the requirement for additional provision of a new color filter.

SUMMARY OF THE INVENTION

In order to attain the object described above, according to the present invention, there is provided a white balance controlling apparatus for controlling adjustment of the white balance of a color signal, including luminance detection means for detecting the luminance of pixels of an inputted image signal; luminance comparison means for comparing a maximum value of luminance at a first portion of the image signal corresponding to one frame or one field which includes pixels discriminated at least as pixels of one of green under a light source of the sun or white under a fluorescent light source with a maximum value of luminance at a second portion of the image signal different from the first portion; light source estimation means for estimating, where the maximum value of the luminance at the first portion is lower than the maximum value of the luminance at the second portion, that the light source being used is the light source of the sun, and for estimating, where the maximum value of the luminance at the first portion is higher than the maximum value of the luminance at the second portion, that the light source being used is the fluorescent light source; and adjustment controlling means for outputting an adjustment amount for the color signal in response to a result of the estimation by the light source estimation means so as to suitably adjust the white balance.

In the white balance controlling apparatus, where a maximum value of luminance in a first portion of an image signal corresponding to one frame or one field which includes pixels discriminated at least as one of green under a light source of the sun or white under a fluorescent light source is lower than a maximum value of luminance in a second portion of the image signal, it is estimated that the light source being currently used is a light source of the sun, but where the maximum value of the luminance in the first portion is higher than the maximum value of the luminance in the second portion, it is estimated that the light source being used is a fluorescent light source. Therefore, it is discriminated with certainty whether a subject is a green subject under a light source of the sun or a white subject under a fluorescent light source. Accordingly, it is discriminated with certainty whether the light source upon image pickup is a light source of the sun or a fluorescent light source, and the color signal is adjusted with certainty in response to a result of the discrimination so that the white balance is suitably adjusted. Further, the image quality can be enhanced without adding a new color filter.

The above and other objects, features and advantages of the present invention will become apparent from the following description and the appended claims, taken in conjunction with the accompanying drawings in which like parts or elements denoted by like reference symbols.

DETAILED DESCRIPTION

In the following, embodiments of the present invention wherein the present invention is applied to a digital still camera are described in detail with reference to the drawings.

Figure 1:
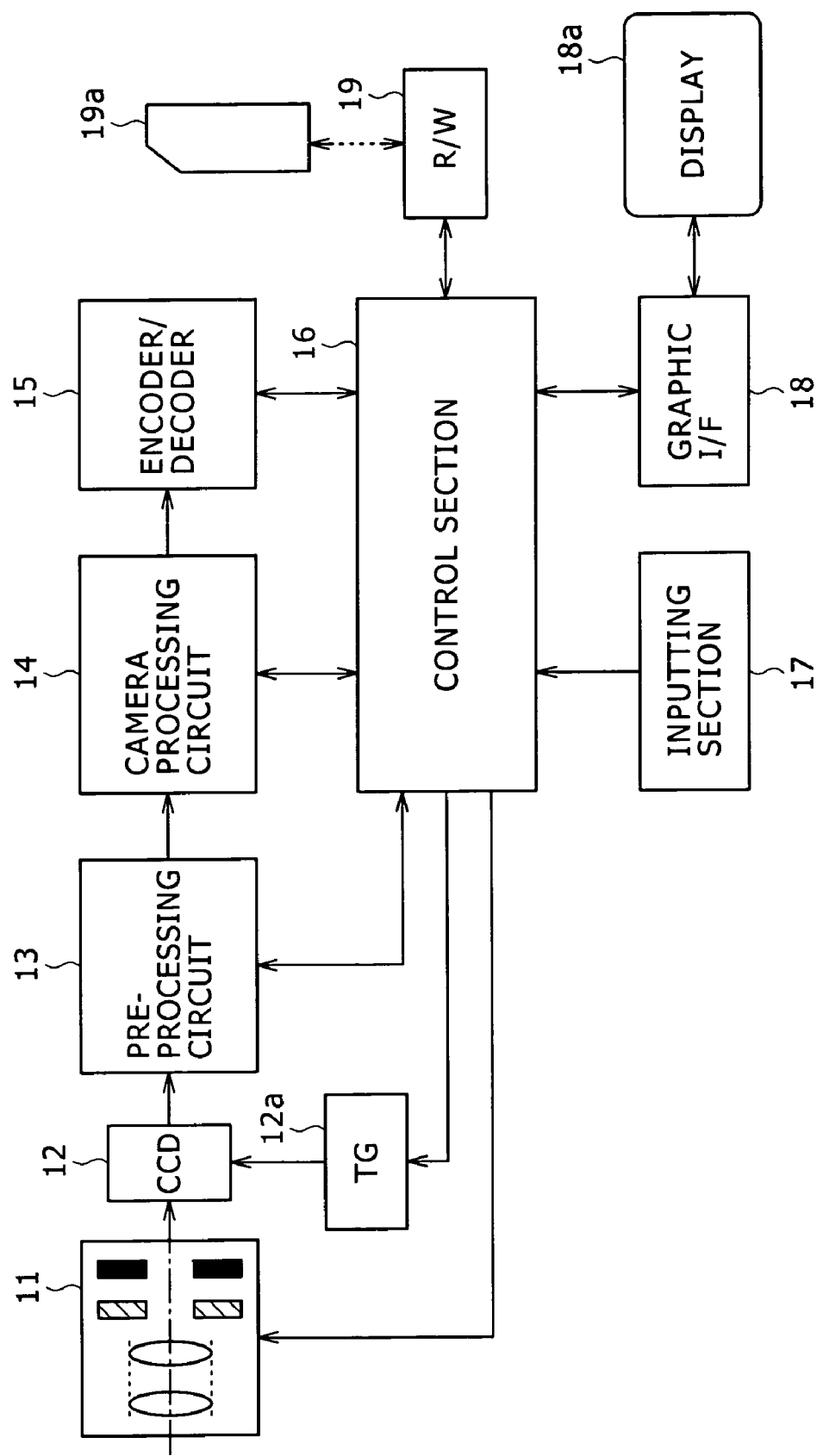
FIG. 1 is a block diagram showing a digital still camera to which the present invention is applied.

FIG. 1 shows a digital still camera to which the present invention is applied.

Referring to FIG. 1, the digital still camera shown includes an optical block 11, a CCD unit 12, a timing generator (TG) 12a, a pre-processing circuit 13, a camera processing circuit 14, an encoder/decoder 15, a control section 16, an inputting section 17, a graphic interface (I/F) 18, a display unit 18a, a reader/writer (R/W) 19, and a memory card 19a. The optical block 11, timing generator 12a, pre-processing circuit 13, camera processing circuit 14, encoder/decoder 15, inputting section 17, graphic interface 18 and reader/writer 19 are connected to the control section 16.

The optical block 11 includes a lens for condensing light from a subject on the CCD unit 12, a driving mechanism for moving the lens to perform focusing or zooming, a shutter mechanism, an iris mechanism and so forth. The lens and the mechanisms are driven based on control signals from the control section 16.

The CCD unit 12 is driven based on a timing signal outputted from the timing generator 12a, and converts incoming light from a subject into an electric signal. It is to be noted that some other solid-state image pickup device such as a CMOS (Complementary Metal Oxide Semiconductor) image sensor may be used in place of the CCD unit 12. The timing generator 12a outputs the timing signal under the control of the control section 16.

The pre-processing circuit 13 performs a sample hold process for an image signal outputted from the CCD unit 12 so that an S/N (Signal/Noise) ratio is kept good through a CDS (Correlated Double Sampling) process. Further, the pre-processing circuit 13 controls the gain through an AGC (Auto Gain Control) process, and performs an A/D conversion process and outputs a digital image signal.

The camera processing circuit 14 performs camera signal processes such as a white balance adjustment process, a color correction process, an AF (Auto Focus) process, an AE (Auto Exposure) process and so forth for the image signal from the pre-processing circuit 13.

The encoder/decoder 15 performs a compression encoding process for the image signal from the camera processing circuit 14 in a predetermined still picture image data format such as a JPEG (Joint Photographic Coding Experts Group) system or the like. Further, the encoder/decoder 15 performs a decompression decoding process for encoded data of a still picture image supplied from the control section 16.

The control section 16 is a microcontroller formed, for example, from a CPU (Central Processing Unit), a ROM (Read Only Memory), a RAM (Random Access Memory) and so forth, and executes a program stored in the ROM and so forth so that the components of the digital still camera are controlled generally.

The inputting section 17 is formed from various operation keys such as, for example, a shutter release button and so forth, a lever and a dial, and outputs a control signal to the control section 16 in response to inputting operation by the user.

The graphic interface 18 produces an image signal to be displayed on the display unit 18a from the image signal supplied thereto from the control section 16, and supplies the image signal to the display unit 18a so as to be displayed on the display unit 18a. The display unit 18a is formed, for example, from an LCD (Liquid Crystal Display) unit and displays a camera-through-image during image pickup, an image produced by reproducing data recorded on the memory card 19a and so forth.

The memory card 19a which is formed from a portable type flash memory is removably connected as a recording medium for recording image data produced by image pickup and so forth to the reader/writer 19. The reader/writer 19 writes data supplied from the control section 16 on the memory card 19a, and outputs data read out from the memory card 19a to the control section 16. It is to be noted that, for example, a writable optical disk, a hard disk drive (HDD) or the like may be used as a recording medium.

Here, basic operation of the digital still camera is described. First, operation upon image pickup of a still picture image is described.

Before a still picture image is picked up, a signal obtained through upon reception of light and execution of an electro-optic conversion process by the CCD unit 12 is successively supplied to the pre-processing circuit 13. The pre-processing circuit 13 performs a CDS process and an AGC process for the inputted signal and converts the processed signal into a digital signal. The camera processing circuit 14 performs a picture quality correction process for the digital image signal supplied thereto from the pre-processing circuit 13 and supplies the processed signal as a signal of a camera-through-image to the graphic interface 18 through the control section 16. Consequently, the camera-through-image is displayed on the display unit 18a, and the user can perform adjustment of the angle of view while looking at the image displayed on the display unit 18a.

Then, if the shutter release button of the inputting section 17 is depressed in the state just described, then the control section 16 outputs a control signal to the optical block 11 and the timing generator 12a to cause the shutter of the optical block 11 to operate. Consequently, an image signal for one frame is outputted from the CCD unit 12.

The camera processing circuit 14 performs an image quality correction process for the image signal for one frame supplied from the CCD unit 12 through the pre-processing circuit 13 and supplies the resulting image signal to the encoder/decoder 15. The encoder/decoder 15 performs a compression encoding process for the inputted image signal and supplies thus produced encoded data to the reader/writer 19 through the control section 16. Consequently, a data file of the picked up still picture image is stored into the memory card 19a.

On the other hand, where a still picture image file stored in the memory card 19a is to be reproduced, the control section 16 reads out a selected still picture image file from the memory card 19a through the reader/writer 19 in response to an input of operation from the inputting section 17 and supplies the read out file to the encoder/decoder 15 to cause the encoder/decoder 15 to execute a decompression decoding process. The decoded image signal is supplied to the graphic interface 18 through the control section 16. Consequently, a still picture image is reproduced and displayed on the display unit 18a.

Figure 2:
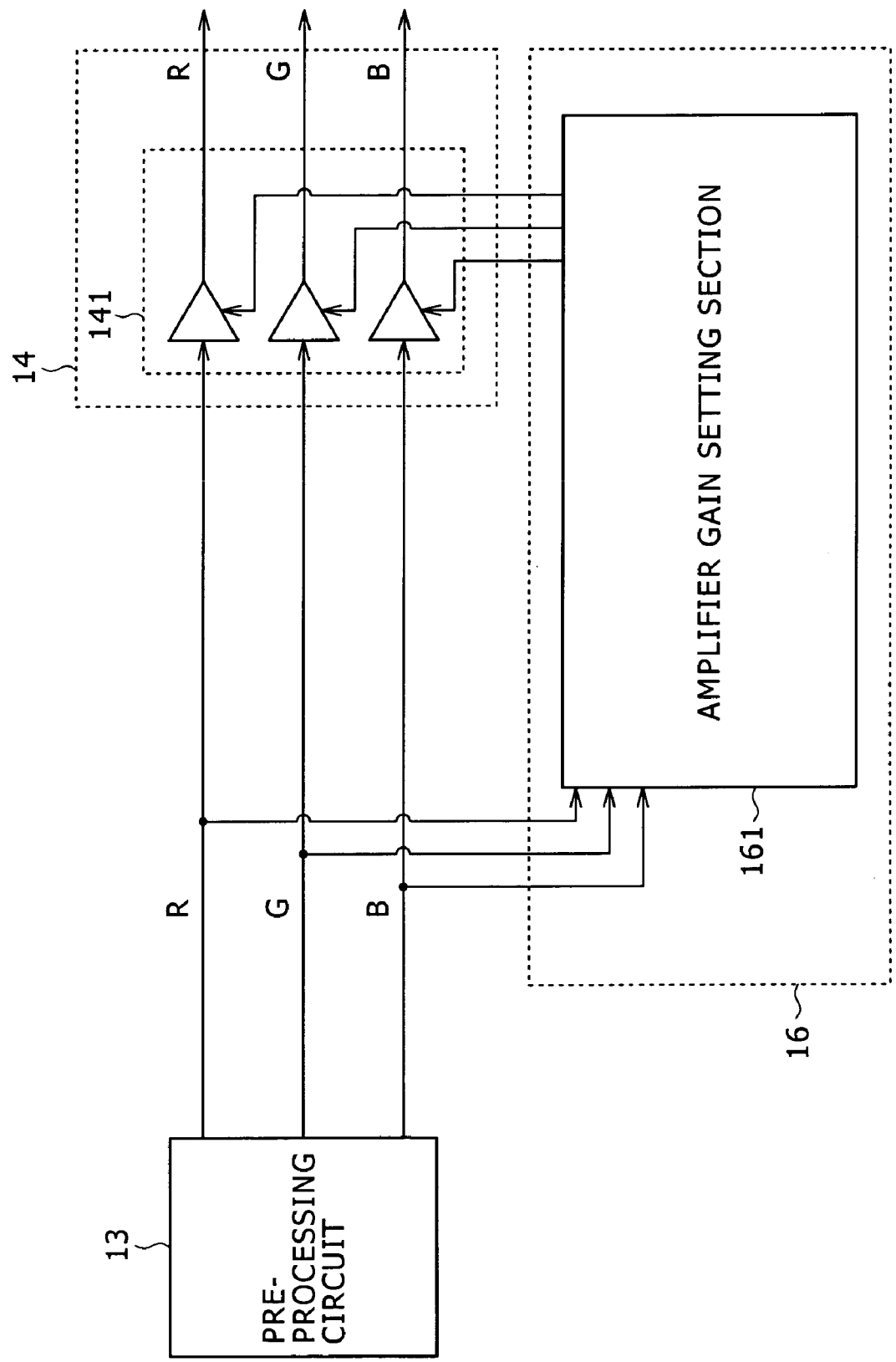
FIG. 2 is a functional block diagram showing a configuration for white balance adjustment of the digital still camera of FIG. 1.

Now, the white balance adjustment process by the camera processing circuit 14 and the control section 16 is described. FIG. 2 shows a functional configuration for a white balance adjustment function.

The camera processing circuit 14 includes a white balance (WB) amplifier 141. The control section 16 includes an amplifier gain setting section 161. It is to be noted that various functions of the control section 16 are implemented, for example, by software processing.

RGB image signals picked up by the CCD unit 12 are digitized by the pre-processing circuit 13 and inputted to the camera processing circuit 14 and the control section 16. The white balance amplifier 141 includes amplifiers for individually adjusting the levels of the RGB signals to flow through the camera processing circuit 14 to generally adjust the white balance. The gains of the amplifiers are set by a control signal from the amplifier gain setting section 161.

The control section 16 includes the amplifier gain setting section 161 for setting the amplifier gains of the white balance amplifier 141. The amplifier gain setting section 161 extracts, for example, a white portion in a picked up image supplied thereto and calculates values of the amplifier gains such that the RGB signals with regard to the white portion are equal to each other. As the values of the amplifier gains are set to the white balance amplifier 141, the white balance is suitably adjusted. Further, the amplifier gain setting section 161 includes a function for estimating, based on luminance information, whether an image pickup light source is the sun or a fluorescent lighting. The function just described is used in order to accurately make discrimination between a green subject under a light source of the sun and a white subject under a light source of a fluorescent lighting.

It is to be noted that pickup image signals to be used as a detection object are not limited to those of RGB components, and, for example, a color difference signal, an I signal, a Q signal and so forth may be used instead.

Figure 3:
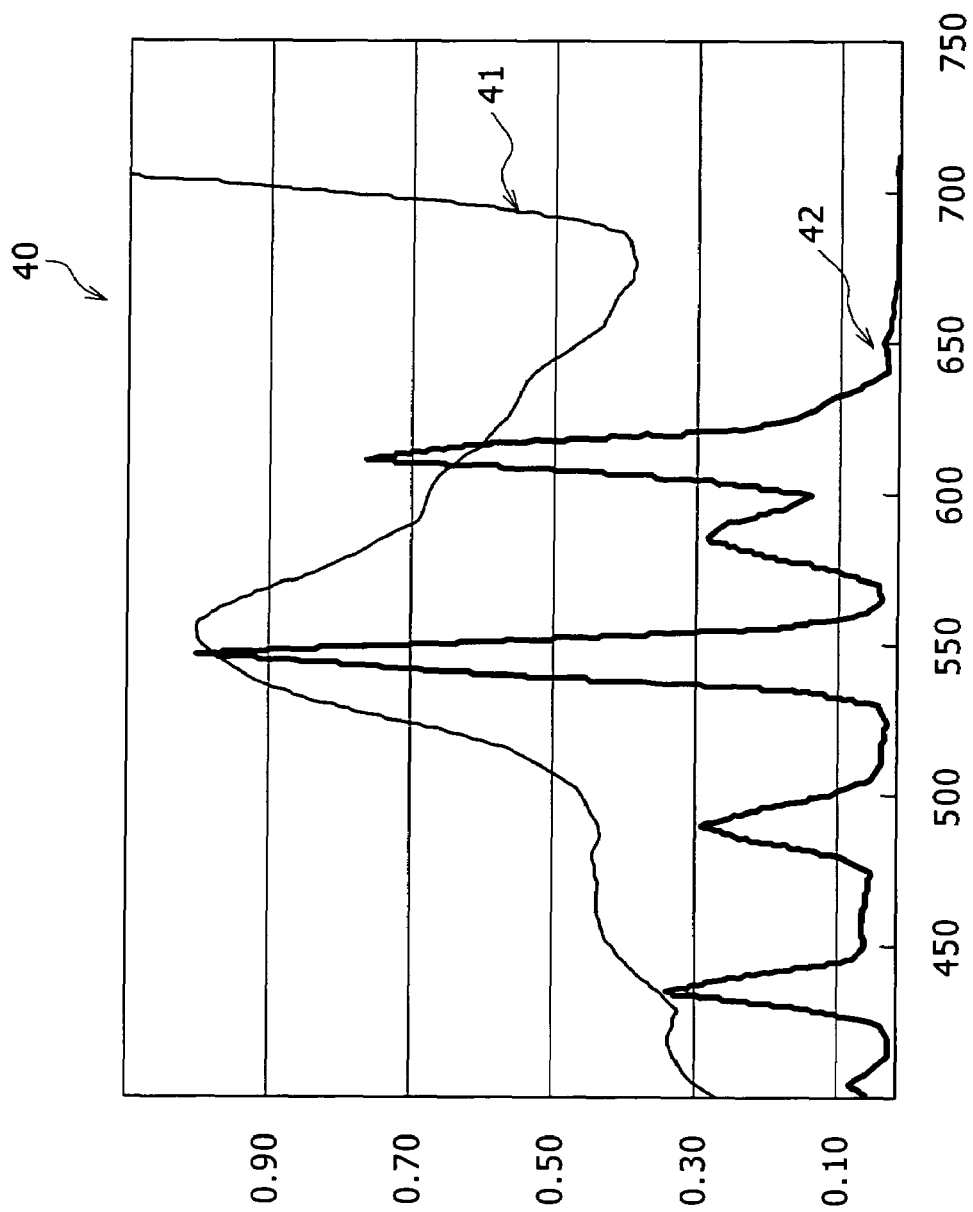
FIG. 3 is a graph illustrating an example of spectral characteristics of different subjects.

Now, spectral characteristics of a green subject under a light source of the sun and a white subject under a light source of a fluorescent lighting are described. FIG. 3 illustrates an example of spectral characteristics.

A green subject 41 which is under a light source of the sun and a white subject 42 which is under a light source of a fluorescent lighting exhibit such spectral characteristics 40 as illustrated in FIG. 3. Where RGB signals included in a picked up image signal are separated from each other by a color filter, there is the possibility that it may be discriminated in error that the RGB signals are substantially same as each other in the inside of the image pickup apparatus and the white balance may be adjusted based on the wrong result of discrimination of the light source. Therefore, in the present embodiment, such light sources as mentioned above are discriminated accurately by the control section 16 to correctly adjust the white balance.

Figure 4:
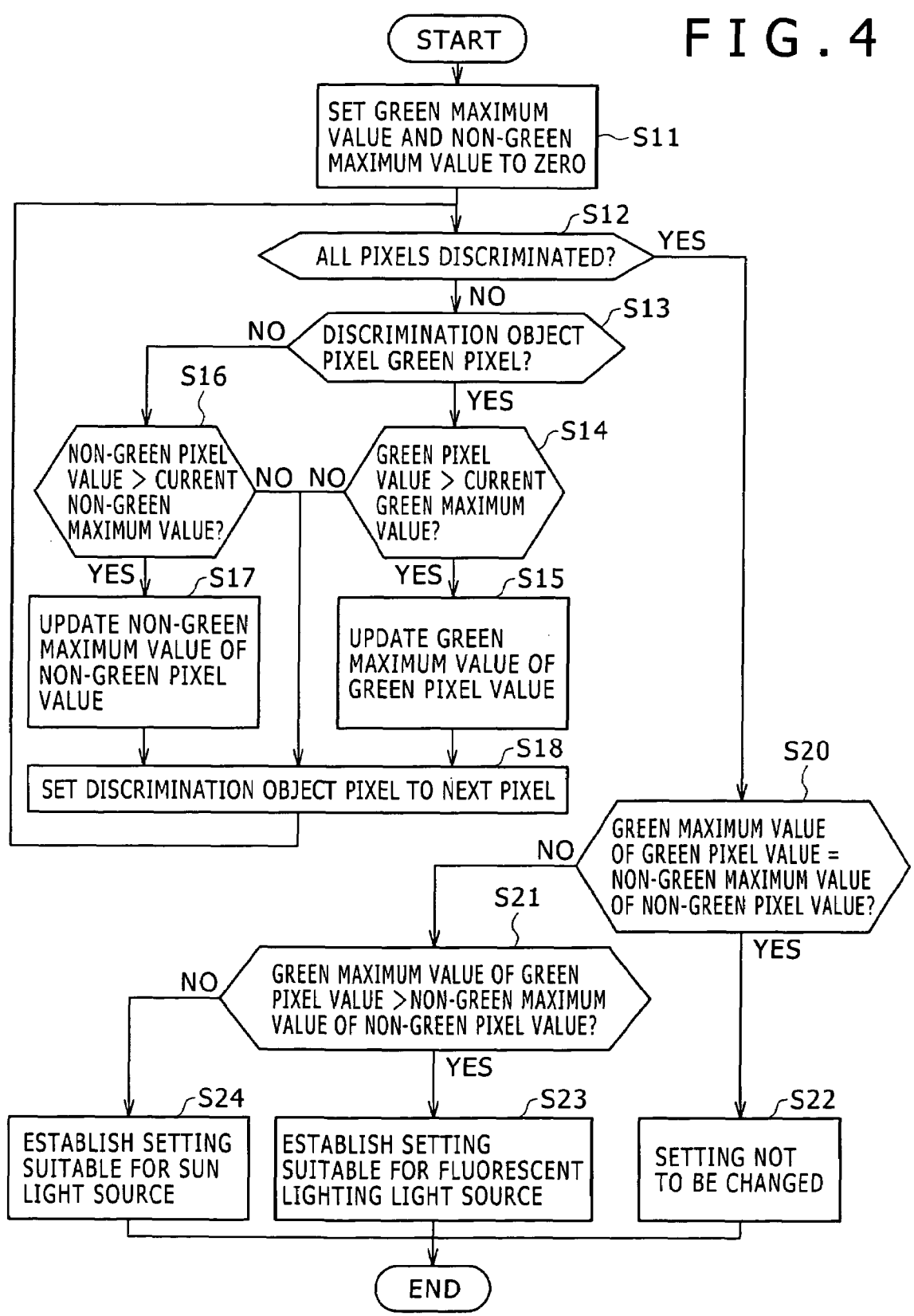
FIG. 4 is a flow chart illustrating a process of an amplifier gain setting section of a white balance controlling apparatus according to a first embodiment of the present invention.

Now, a process of estimating of a light source of the sun or a light source of a fluorescent lighting by the amplifier gain setting section 161 is described. FIG. 4 is a flow chart illustrating a process of the amplifier gain setting section according to a first embodiment of the present invention.

Step S11: The amplifier gain setting section 161 sets initial values of a green maximum value and a non-green maximum value to zero. Further, the amplifier gain setting section 161 sets a discrimination object pixel to a predetermined first pixel in a screen.

Step S12: The amplifier gain setting section 161 decides whether or not all of pixels in one frame or one field are discriminated. If all of the pixels are discriminated, then the processing of the amplifier gain setting section 161 advances to step S20, but if all of the pixels are not discriminated, then the processing advances step S13.

Step S13: The amplifier gain setting section 161 decides based on RGB information of the discrimination object pixel using a predetermined threshold valve whether or not the discrimination object pixel is a green pixel. Here, whether or not the discrimination object pixel is a green pixel is discriminated depending upon pixel value differences such as the red pixel value–green pixel value<0 and the blue pixel value–green pixel value<0 or the like. Or, the discrimination of whether or not the discrimination object pixel is a green pixel may alternatively be made based on pixel value ratios such as the red pixel value<green pixel value and the blue pixel value<green pixel value or the like. If the discrimination object pixel is a green pixel, then the processing advances to step S14, but if the discrimination object pixel is not a green pixel, then the processing advances to step S16.

Step S14: The amplifier gain setting section 161 compares the green pixel value of the discrimination object pixel with the current green maximum value. If the green pixel value of the discrimination object pixel is higher, then the processing advances to step S15, but if the current green maximum value is higher, then the processing advances to step S18.

Step S15: The amplifier gain setting section 161 updates the green maximum value of the green pixel value.

Step S16: The amplifier gain setting section 161 compares the non-green pixel value of the discrimination object pixel with the current non-green maximum value. If the non-green pixel value of the discrimination object pixel is higher, then the processing advances to step S17, but if the current non-green maximum value is higher, then the processing advances to step S18.

Step S17: The amplifier gain setting section 161 updates the non-green maximum value of the non-green pixel value.

Step S18: The amplifier gain setting section 161 sets the discrimination object pixel to a next pixel without updating the green maximum value and the non-green maximum value.

Step S20: The amplifier gain setting section 161 decides whether or not the green maximum value of the green pixel value is equal to the non-green maximum value of the non-green pixel value. If the two values are equal to each other, then the processing advances to step S22, but if the two values are not equal to each other, then the processing advances to step S21.

Step S21: The amplifier gain setting section 161 decides whether or not the green maximum value of the green pixel value is higher than the non-green maximum value of the non-green pixel value. If the green maximum value is higher than the non-green maximum value, then the processing advances to step S23, but if the green maximum value is lower than the non-green maximum value, then the processing advances to step S24.

Step S22: Since estimation of the light source by the process described above is impossible, the amplifier gain setting section 161 maintains the setting for the white balance amplifier 141 based on the white portion detected from the image signal without altering the setting.

Step S23: Since a white subject under a light source of a fluorescent lighting discriminated as a green subject frequently has a reflectance and exhibits a luminance which are higher than those of the other articles, the amplifier gain setting section 161 decides that the image pickup light source of the green subject is a light source of a fluorescent lighting. Therefore, the amplifier gain setting section 161 performs setting for the white balance amplifier 141 suitable for a light source of a fluorescent lighting.

Step S24: Since a green subject under a light source of the sun discriminated as a green subject frequently has a reflectance and exhibits a luminance which are lower than those of the other articles, the amplifier gain setting section 161 decides that the image pickup light source of the green subject is a light source of the sun. Therefore, the amplifier gain setting section 161 performs setting for the white balance amplifier 141 suitable for a light source of the sun.

Figure 5:
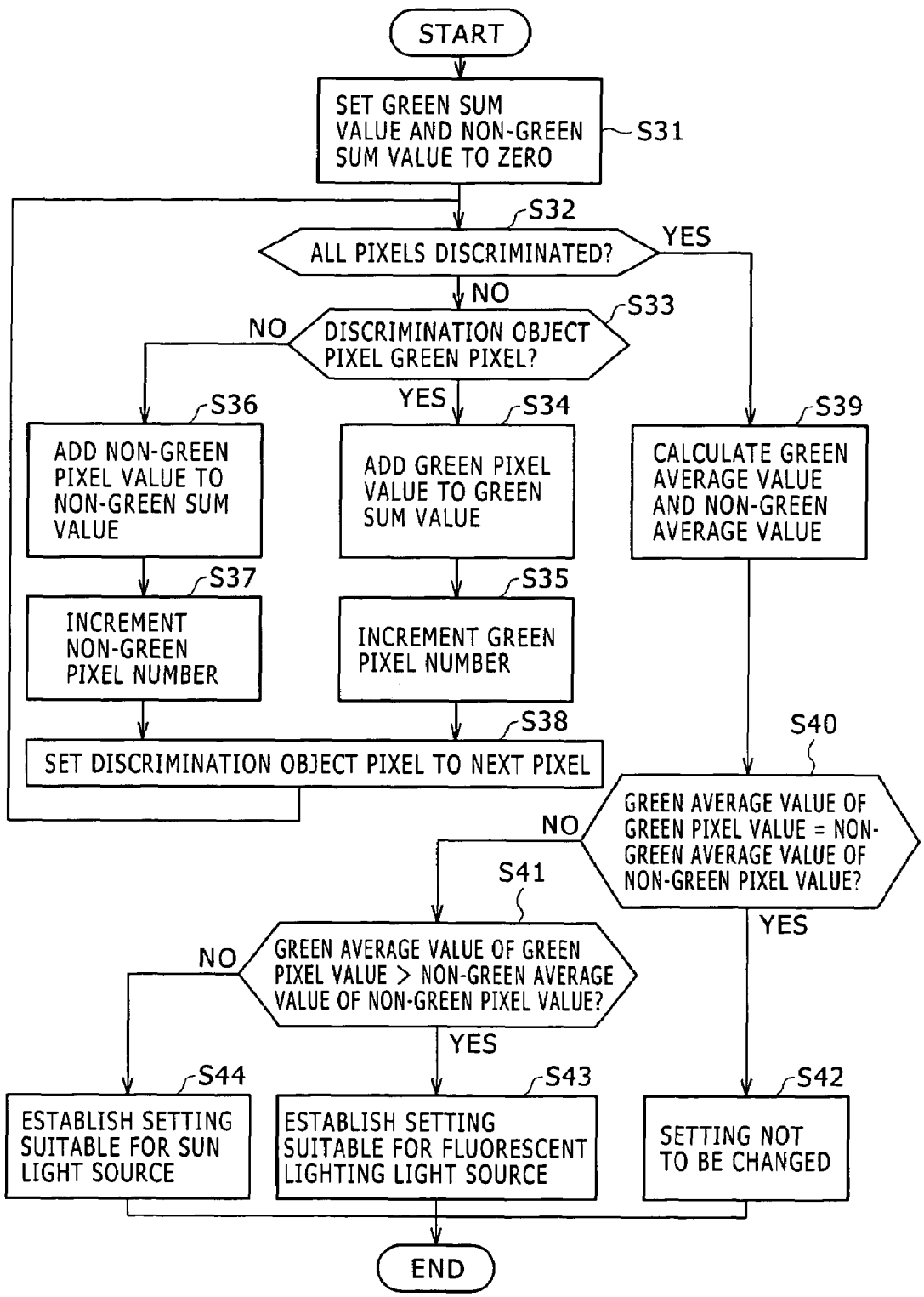
FIG. 5 is a flow chart illustrating a process of an amplifier gain setting section of a white balance controlling apparatus according to a second embodiment of the present invention.

Now, a process of the amplifier gain setting section 161 according to a second embodiment of the present invention is described. FIG. 5 illustrates the process of the amplifier gain setting section 161 according to the second embodiment.

Step S31: The amplifier gain setting section 161 sets a green sum value and a non-green sum value of the luminance to zero. Further, the amplifier gain setting section 161 sets a discrimination object pixel to a predetermined first pixel in a screen.

Step S32: The amplifier gain setting section 161 decides whether or not all pixels in one frame or one field are discriminated. If it is decided that all such pixels are discriminated, then the processing of the amplifier gain setting section 161 advances to step S39, but if it is not decided that all such pixels are discriminated, then the processing advances to step S33.

Step S33: The amplifier gain setting section 161 decides based on RGB information of the discrimination object pixel using a predetermined threshold valve whether or not the discrimination object pixel is a green pixel. Here, whether or not the discrimination object pixel is a green pixel is discriminated depending upon pixel value differences such as the red pixel value−green pixel value<0 and the blue pixel value−green pixel value<0 or the like. Or, the discrimination of whether or not the discrimination object pixel is a green pixel may alternatively be made based on pixel value ratios such as the red pixel value<green pixel value and the blue pixel value<green pixel value or the like. If the discrimination object pixel is a green pixel, then the processing advances to step S34, but if the discrimination object pixel is not a green pixel, then the processing advances to step S36.

Step S34: The amplifier gain setting section 161 adds the green pixel value of the discrimination object pixel to the green sum value.

Step S35: The amplifier gain setting section 161 increments the green pixel value.

Step S36: The amplifier gain setting section 161 adds the non-green pixel value of the discrimination object pixel to the non-green sum value.

Step S37: The amplifier gain setting section 161 increments the non-green pixel value.

Step S38: The amplifier gain setting section 161 sets the discrimination object pixel to a next pixel without updating the green sum value and the non-green sum value.

Step S39: The amplifier gain setting section 161 calculates a green average value and a non-green average value from the green sum value and the non-green sum value, respectively.

Step S40: The amplifier gain setting section 161 decides whether or not the green average value of the green pixel value is equal to the non-green average value of the non-green pixel value. If the two values are equal to each other, then the processing advances to step S42, but if the two values are not equal to each other, then the processing advances to step S41.

Step S41: The amplifier gain setting section 161 decides whether or not the green average value of the green pixel value is higher than the non-green average value of the non-green pixel value. If the green average value is higher than the non-green average value, then the processing advances to step S43, but if the green average value is lower than the non-green average value, then the processing advances to step S44.

Step S42: Since estimation of the light source by the process described above is impossible, the amplifier gain setting section 161 maintains the setting for the white balance amplifier 141 based on the white portion detected from the image signal without altering the setting.

Step S43: Since a white subject under a light source of a fluorescent lighting discriminated as a green subject frequently has a reflectance and exhibits a luminance which are higher than those of the other articles, the amplifier gain setting section 161 decides that the image pickup light source of the green subject is a light source of a fluorescent lighting. Therefore, the amplifier gain setting section 161 performs setting for the white balance amplifier 141 suitable for a light source of a fluorescent lighting.

Step S44: Since a green subject under a light source of the sun discriminated as a green subject frequently has a reflectance and exhibits a luminance which are lower than those of the other articles, the amplifier gain setting section 161 decides that the image pickup light source of the green subject is a light source of the sun. Therefore, the amplifier gain setting section 161 performs setting for the white balance amplifier 141 suitable for a light source of the sun.

It is to be noted that, while, in the processes of FIGS. 4 and 5, a light source is discriminated in a unit of one pixel, an integrator may be used to perform the discrimination in a unit of a plurality of pixels to reduce the amount of calculation. In particular, the amplifier gain setting section 161 decides, at step S32, for each plurality of pixels, whether or not all portions of one frame or one field are discriminated. Further, at step S33, the amplifier gain setting section 161 decides, for each plurality of pixels, whether or not the discrimination object pixels are green pixels. Further, at steps S40 and S41, the amplifier gain setting section 161 compares, for each plurality of pixels, the green average value of the green pixel value and the non-green average value of the non-green pixel value with each other.

Further, while, in the processes of FIGS. 4 and 5, comparison in luminance is performed between a region decided as a region of green and any other region, comparison in luminance may be performed otherwise, for example, between a region decided as a region of white and any other region. Or else, comparison in luminance may be performed, for example, between a region decided either as a region of white or as a region of green and any other region.

According to the embodiments described above, since it can be discriminated accurately whether an image pickup subject is a green subject under a light source of the sun or a white subject under a light source of a fluorescent lighting, the white balance can be adjusted correctly and automatically. Consequently, production of an image whose color is displaced toward the red when it is discriminated in error that a green subject under a light source of the sun is a white subject under a light source of a fluorescent lighting and the white balance is adjusted so as to be suitable for a light source of a fluorescent lighting based on the discriminated green can be prevented. Further, production of an image whose color is displaced toward the green when it is discriminated in error that a white subject under a light source of a fluorescent lighting is a green subject under a light source of the sun and the white balance is adjusted so as to be suitable for a light source of the sun based on the discriminated white can be prevented. Further, there is no necessity to additionally provide a new color filter or filters for the discrimination of the light sources, and the picture quality can be enhanced with minimum modification to the specifications such as, for example, modification to a software program to be executed by the control section 16.

Further, according to the process of the second embodiment described hereinabove with reference to FIG. 5, since an average value is used in place of a maximum value of luminance to perform discrimination of a light source, accurate discrimination can be achieved also in such a case that halation occurs when light of an intensity exceeding the dynamic range is inputted.

It is to be noted that, while, in the embodiments described above, the present invention is applied to a digital still camera, the present invention can be applied also to any other image pickup apparatus which uses a solid-state image pickup device. For example, the present invention can be applied to a digital video camera and image pickup functions of a portable telephone set, a PDA (Personal Digital Assistant) and so forth. Further, the present invention can be applied also to processing of an image pickup signal by a small-size camera for a visual telephone to be connected to a PC or the like or for game software.

Further, the processing functions of the image pickup apparatus described above can be implemented by a computer. In this instance, a program which describes processing contents of those functions which the image pickup apparatus should have (particularly the functions corresponding to the amplifier gain setting section 161 and so forth) is provided. Then, the program is executed by a computer to implement the processing functions described above. The program which describes the processing contents can be recorded on or in a recording medium which can be read by a computer. A magnetic recording apparatus, an optical disk, a magneto-optical disk, a semiconductor memory and so forth are available as such computer-readable recording media.

In order to distribute the program, for example, portable recording media on or in which the program is recorded such as an optical disk or a semiconductor memory are sold. Also it is possible to store the program in a storage apparatus of a server computer such that the program can be transferred from the server computer to another computer through a network.

A computer which executes the program stores the program, for example, recorded on or in the portable recording medium or transferred from the server computer into a storage apparatus of the computer itself. Then, the computer reads the program from the storage apparatus of the computer itself and executes processes in accordance with the program. It is to be noted that the computer may otherwise read the program directly from the portable storage medium and execute processes in accordance with the program. Or, the computer may execute a process in accordance with a program every time it receives the program transferred from the server computer.

While preferred embodiments of the present invention have been described using specific terms, such description is for illustrative purposes only, and it is to be understood that changes and variations may be made without departing from the spirit or scope of the following claims.

The invention claimed is:

1. A white balance controlling apparatus for controlling adjustment of the white balance of a color signal, the apparatus comprising:

luminance detection means for detecting the luminance of pixels of an inputted image signal;

luminance comparison means for comparing a maximum value of luminance at a first portion of the image signal corresponding to one frame or one field which includes pixels discriminated at least as pixels of one of green under a light source of the sun or white under a fluorescent light source with a maximum value of luminance at a second portion of the image signal different from the first portion;

light source estimation means for estimating, where the maximum value of the luminance at the first portion is lower than the maximum value of the luminance at the second portion, that the light source being used is the light source of the sun, and for estimating, where the maximum value of the luminance at the first portion is higher than the maximum value of the luminance at the second portion, that the light source being used is the fluorescent light source; and adjustment controlling means for outputting an adjustment amount for the color signal in response to a result of the estimation by the light source estimation means so as to suitably adjust the white balance.

2. The white balance controlling apparatus according to claim 1, wherein the luminance detection means detects the luminance for each pixel of the image signal.

3. The white balance controlling apparatus according to claim 1, wherein the luminance detection means detects the luminance for each plurality of pixels of the image signal, and the luminance comparison means compares a maximum value of luminance in a first region of the image signal discriminated as a region of at least one of green or white for each plurality of pixels with a maximum value of luminance in a region of the image signal different from the first region.

4. An image pickup apparatus having a function of adjusting the white balance of a color signal, the apparatus comprising:

luminance detection means for detecting the luminance of pixels in an image signal obtained by an image pickup;

luminance comparison means for comparing a maximum value of luminance at a first portion of the image signal corresponding to one frame or one field which includes pixels discriminated at least as pixels of one of green under a light source of the sun or white under a fluorescent light source with a maximum value of luminance at a second portion of the image signal different from the first portion;

light source estimation means for estimating, where the maximum value of the luminance at the first portion is lower than the maximum value of the luminance at the second portion, that the light source being used is the light source of the sun, and for estimating, where the maximum value of the luminance at the first portion is higher than the maximum value of the luminance at the second portion, that the light source being used is the fluorescent light source; and adjustment controlling means for outputting an adjustment amount for the color signal in response to a result of the estimation by the light source estimation means so as to suitably adjust the white balance.

5. A white balance controlling method for controlling adjustment of the white balance of a color signal, the method comprising:

detecting the luminance of pixels of an inputted image signal;

comparing a maximum value of luminance at a first portion of the image signal corresponding to one frame or one field which includes pixels discriminated at least as pixels of one of green under a light source of the sun or white under a fluorescent light source with a maximum value of luminance at a second portion of the image signal different from the first portion by use of a comparing device;

estimating, where the maximum value of the luminance at the first portion is lower than the maximum value of the luminance at the second portion, that the light source being used is the light source of the sun, and estimating, where the maximum value of the luminance at the first portion is higher than the maximum value of the luminance at the second portion, that the light source being used is the fluorescent light source; and outputting an adjustment amount for the color signal in response to a result of the estimation so as to suitably adjust the white balance.

6. A computer readable medium having stored thereon a white balance controlling computer program for controlling adjustment of the white balance of a color signal, the white balance controlling program causing a computer to execute the steps of:

detecting the luminance of pixels of an inputted image signal;

comparing a maximum value of luminance at a first portion of the image signal corresponding to one frame or one field which includes pixels discriminated at least as pixels of one of green under a light source of the sun or white under a fluorescent light source with a maximum value of luminance at a second portion of the image signal different from the first portion;

estimating, where the maximum value of the luminance at the first portion is lower than the maximum value of the luminance at the second portion, that the light source being used is the light source of the sun, and estimating, where the maximum value of the luminance at the first portion is higher than the maximum value of the luminance at the second portion, that the light source being used is the fluorescent light source; and outputting an adjustment amount for the color signal in response to a result of the estimation so as to suitably adjust the white balance.

7. A white balance controlling apparatus for controlling adjustment of the white balance of a color signal, the apparatus comprising:

a luminance detection section operable to detect the luminance of pixels of an inputted image signal;

a luminance comparison section operable to compare a maximum value of luminance at a first portion of the image signal corresponding to one frame or one field which includes pixels discriminated at least as pixels of one of green under a light source of the sun or white under a fluorescent light source with a maximum value of luminance at a second portion of the image signal different from the first portion;

a light source estimation section operable to estimate, where the maximum value of the luminance at the first portion is lower than the maximum value of the luminance at the second portion, that the light source being used is the light source of the sun, and operable to estimate, where the maximum value of the luminance at the first portion is higher than the maximum value of the luminance at the second portion, that the light source being used is the fluorescent light source; and an adjustment controlling section operable to output an adjustment amount for the color signal in response to a result of the estimation by the light source estimation section so as to suitably adjust the white balance.

8. An image pickup apparatus having a function of adjusting the white balance of a color signal, the apparatus comprising:

a luminance detection section operable to detect the luminance of pixels in an image signal obtained by an image pickup;

a luminance comparison section operable to compare a maximum value of luminance at a first portion of the image signal corresponding to one frame or one field which includes pixels discriminated at least as pixels of one of green under a light source of the sun or white under a fluorescent light source with a maximum value of luminance at a second portion of the image signal different from the first portion;

a light source estimation section operable to estimate, where the maximum value of the luminance at the first portion is lower than the maximum value of the luminance at the second portion, that the light source being used is the light source of the sun, and operable to estimate, where the maximum value of the luminance at the first portion is higher than the maximum value of the luminance at the second portion, that the light source being used is the fluorescent light source; and an adjustment controlling section operable to output an adjustment amount for the color signal in response to a result of the estimation by the light source estimation section so as to suitably adjust the white balance.

* * * * *